Figure 1:
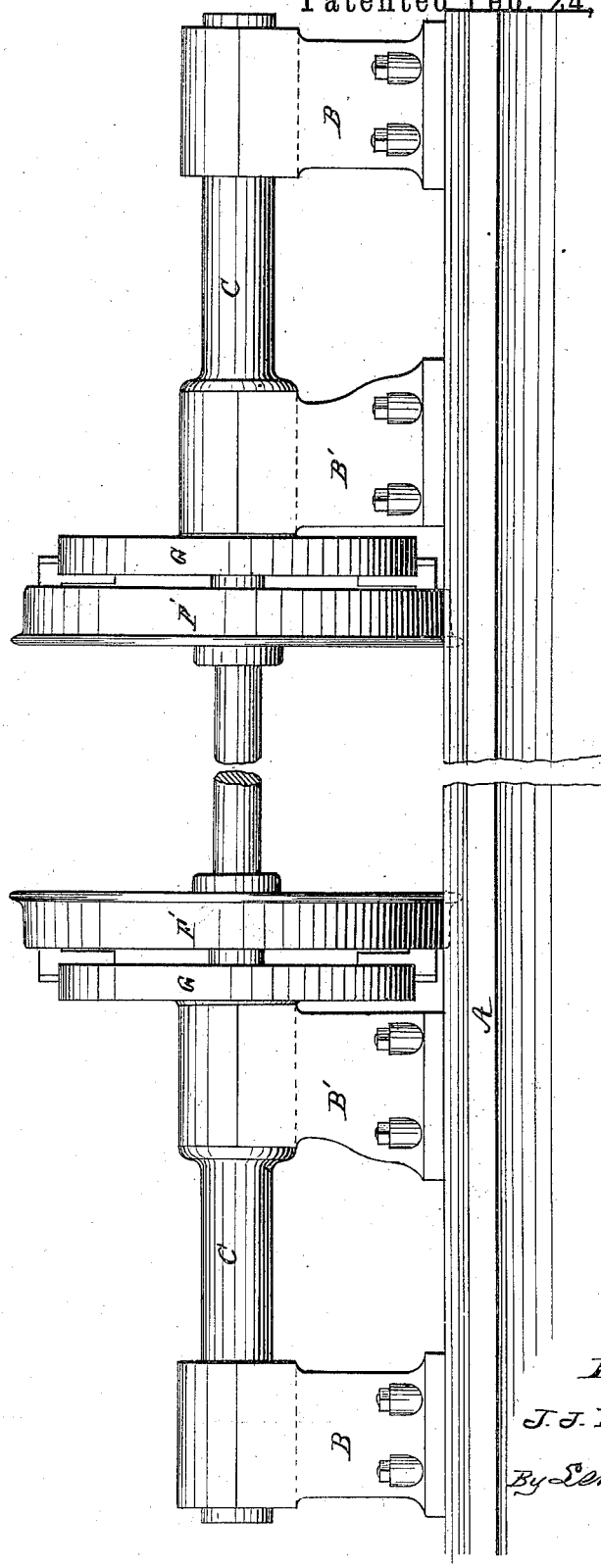

(No Model.) 2 Sheets—Sheet 1.

J. J. BREWIS.
CAR WHEEL LATHE.

No. 312,961. Patented Feb. 24, 1885.

Witnesses:
T. C. Brecht
C. L. Emmons

Inventor:
J. J. Brewis
By E. H. Ginsabaugh
Attorney.

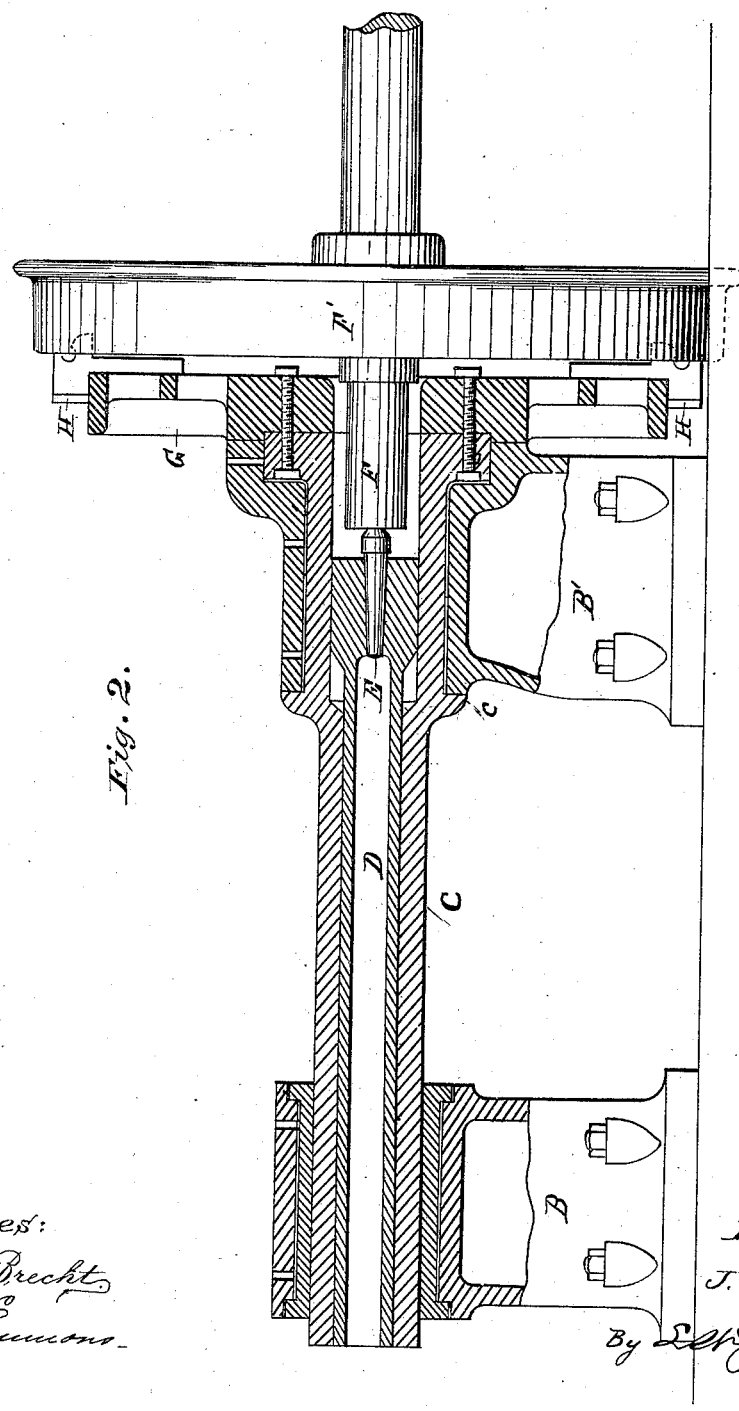

UNITED STATES PATENT OFFICE.

JOHN J. BREWIS, OF MINNEAPOLIS, MINNESOTA, ASSIGNOR TO THE NORTH STAR IRON WORKS COMPANY, OF SAME PLACE.

CAR-WHEEL LATHE.

SPECIFICATION forming part of Letters Patent No. 312,961, dated February 24, 1885.

Application filed October 18, 1884. (No model.)

*To all whom it may concern:*

Be it known that I, JOHN J. BREWIS, a citizen of the United States, residing at Minneapolis, in the county of Hennepin and State of Minnesota, have invented certain new and useful Improvements in Car-Wheel Lathes, of which the following is a specification, reference being had therein to the accompanying drawings.

My invention relates to certain improvements in lathes for turning and finishing car-wheels; and it has for its objects to provide for chucking the wheels while mounted on the axle between the lathe-centers, so that they can be driven by a face plate or face plates having clutches connecting directly to the wheel or wheels, so as to insure their rotation against the turning or finishing tool, thus obviating the tendency to slip, as is experienced in the use of a dog applied to the axle, which has rendered it almost impossible to turn or grind a chilled-steel wheel.

Figure 1 is a front view showing two sets of head-stocks. Fig. 2 is a sectional view of one set of head-stocks with chuck in position for use.

In the drawings, the letter A indicates the bed of the lathe, which may be of the ordinary or any approved construction. The said bed is provided with double head-stocks B B and B' B' at each end, the head-stocks B B being stationary, or securely bolted to the bed, while the stocks B' B' are movable, and can be clamped to the bed at any desired distance apart, after the manner of the ordinary movable tail-stock. The movable head-stocks are precisely alike, and are provided with hollow spindles C, which are adapted to turn in bearings in the stocks, the said spindles being provided with shoulders c, which prevent any longitudinal movement of said spindles in the movable stocks. The hollow spindles C are provided with supplemental spindles D, which fit within them, and are adapted to carry the standard lathe-centers E, between which the axle F of the car-wheels F' is suspended.

The letter G indicates a face-plate having an opening at the center, through which the end of the axle passes. The said face-plate is secured to the forward end of the hollow spindle by means of screw-bolts G', or in any convenient manner, and is provided with the usual clutches, H, by means of which the car-wheel may be chucked directly at the inside of its web, as shown in the drawings, so as to insure the greatest possible amount of leverage and insure the rotation of the wheel against the tool. The hollow spindles C extend toward each end of the lathe through bearings in the head-stocks B B, which are precisely alike, the said spindles being capable of a longitudinal movement in the stationary heads, in order to allow the lathe-centers to be adjusted to mount the axle and the wheel or wheels between them. One face-plate alone may be employed and secured to one of the hollow spindles; or two may be used—one on each spindle—and clutched to the wheels near each end of the spindle, as shown in the drawings. When but one face-plate is used, an ordinary tail-stock is employed, and the end of the axle opposite that bearing the chucked wheel is centered upon the back center of said tail-stock.

The operation of my invention will be readily understood in connection with the above description, and is as follows: The movable head-stocks are set apart a proper distance for the insertion of the axle carrying the wheel or wheels to be turned. This being accomplished, the head-stocks are moved toward each other until the axle enters the spindles and is held between the centers. The movable head-stocks are then clamped to the bed, and the clutches of the face-plate are then brought to bear upon the wheel and clamped in position, when the lathe is ready for work.

The power may be applied to either or both of the hollow spindles C in any suitable manner, as will be readily understood by any skilled mechanic.

In a recent application filed by me the 10th day of November, 1884, and numbered 147,538, was described and claimed a hollow spindle and centering devices in connection with an adjustable follower, and such I disclaim in the present case.

Having thus described my invention, what I claim, and desire to secure by Letters Patent, is—

1. The combination, in a lathe for turning car-wheels, of a movable head-stock having a hollow spindle turning in bearings therein, and a supplementary hollow spindle adapted to receive the lathe-center, substantially as and for the purpose specified.

2. The combination, with the movable head-stock B' and its hollow spindle, of the stationary head-stock B, having a bearing in which the hollow spindle may be moved longitudinally to center the axle, substantially as specified.

3. The combination, with the movable head-stock and the hollow spindles and lathe-center, of the face-plate and clutches, whereby the wheel is chucked in the lathe, substantially as set forth.

4. The combination, with the movable head-stock, its hollow spindle, center, and face-plate, of the stationary stock having a bearing wherein the outer hollow spindle may be moved longitudinally, substantially as specified.

5. The combination, in a lathe, of the movable head-stocks having hollow spindles and centers, and the face-plate with the stationary head-stocks having bearings in which the spindles may move longitudinally, substantially as and for the purposes set forth.

In testimony whereof I affix my signature in presence of two witnesses.

JOHN J. BREWIS.

Witnesses:
 E. N. DARROW,
 A. J. ROBINSON.